Figure 1:
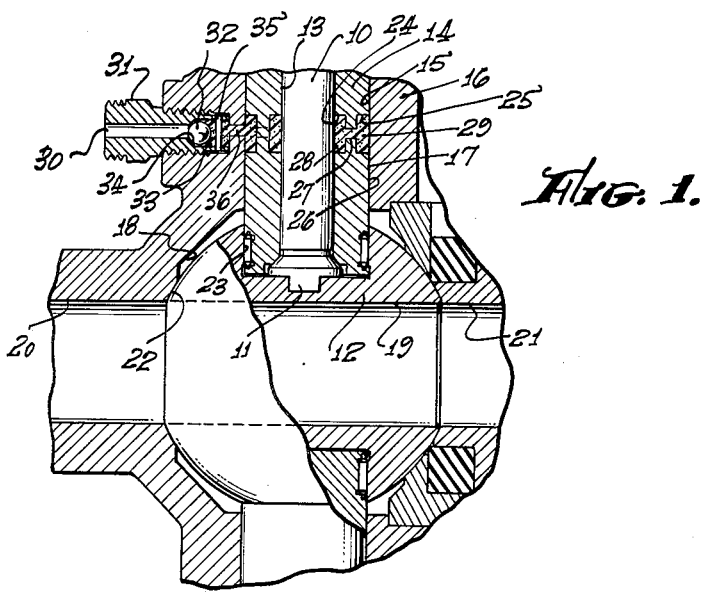

July 11, 1961

G. S. KNOX 2,992,028

PACKED-OFF CLEARANCE AND METHOD OF PACKING-OFF SAME

Filed Aug. 26, 1957

GRANVILLE S. KNOX,
INVENTOR.

By H. Calvin White

ATTORNEY.

United States Patent Office 2,992,028
Patented July 11, 1961

2,992,028
PACKED-OFF CLEARANCE AND METHOD OF PACKING-OFF SAME
Granville S. Knox, Glendale, Calif., assignor to Hydril Company, Los Angeles, Calif., a corporation of Ohio
Filed Aug. 26, 1957, Ser. No. 680,337
2 Claims. (Cl. 288—8)

This invention has to do generally with the packing off of clearances between metal members, and more particularly concerns a novel method and means by which clearance between relatively movable metal members, for example pump shafts, valve stems and housings therefor, may be more effectively packed off with tetrafluoroethylene polymer resin to prevent flow of pressurized liquid across the barrier created by the packing. The invention is of particular importance in those applications where packing material must be forced through small-bore fittings, orifices, restricted openings, past check valves, and around relatively sharp corners or small radius bends. This application is a continuation-in-part of my copending prior application entitled "Packing Composition and Method of Making Same," Serial No. 502,235, filed April 18, 1955, and now abandoned.

Speaking generally with respect to the use for packing purposes of molded tetrafluoroethylene resin, known by the trade name "Teflon," it has been found that preformed, sintered solid rings of this material are extremely effective as packings, particularly shaft packings, due to the chemical inertness, the heat resistance, the toughness, resiliency, and anti-frictional properties of that material. (For the sake of simplicity, we will hereinafter refer to the material by its trade name of "Teflon.") It was therefore natural to conclude that it would be advantageous to use "Teflon" in situations where the packing is done by pressural injection, using the material in granular form for this purpose.

However, such attempts met with initial failure, for despite the low coefficient of friction of the material, it was found that the grains would not relatively slide when extrusion or injection pressures were applied. Apparently the surface irregularities of adjacent grains became interlocked in such a manner as to severely resist such relative movement. Accordingly, when attempts were made to force the granular "Teflon" through restricted orifices, around check valves or around relatively sharp corners, the material merely "choked" and then packed solidly at the "entrance" of the passageway or at the first partial barrier and thereafter resisted all efforts to force it effective into the packing groove.

A major object of the preesnt invention, representing a solution to the problem which has been discussed briefly, concerns the development of a method for successfully injecting "Teflon" particles into packing spaces to fill the same, and the alternate provision of a packing which effectively maintains sealing pressure against the members forming the packing space, even under high temperature operating conditions.

Accordingly, the novel method contemplates injecting into the packing space, as for example through a restricted opening thereinto, a mass of tetrafluoroethylene polymer resin particles previously coated with an other than solid lubricant, the latter enabling the individual particles to slide with respect to one another around barriers, through restricted openings and the like, when the mass is exposed to injection or extrusion pressures. The injection is continued until the mass fills the packing space exerting pressure against the adjacent members forming the packing space, and between which is the clearance to be packed off.

Preferably, the injection is carried out to compress the resilient "Teflon" particles, into a sufficiently compacted mass so that in the event of subsequent partial lubricant dissipation from the packing space, as by evaporation, run-out through the clearance, or the like upon application of heat, the "Teflon" particles will partially expand from extreme compressed condition and fill some of the space previously occupied by the lubricant to thereby maintain the exertion of sealing pressure against the members for packing off the clearance therebetween. Also, the pressurized mass is confined against escape from the packing space through the injection opening, as for example by a check valve.

A large loss of lubricant from the packing space, as a result of high temperature conditions, may make it necessary to inject more packing into the space for maintaining full sealing pressure against the members. In order to minimize the need for such injection of additional packing under high temperature conditions, it is a further object of the invention to provide a non-melting viscous coating for the "Teflon" particles in order to produce an injectable packing wherein the coating material will not liquefy or evaporate at elevated temperatures and will therefore not soon become dissipated from the packing space.

Figure 2:
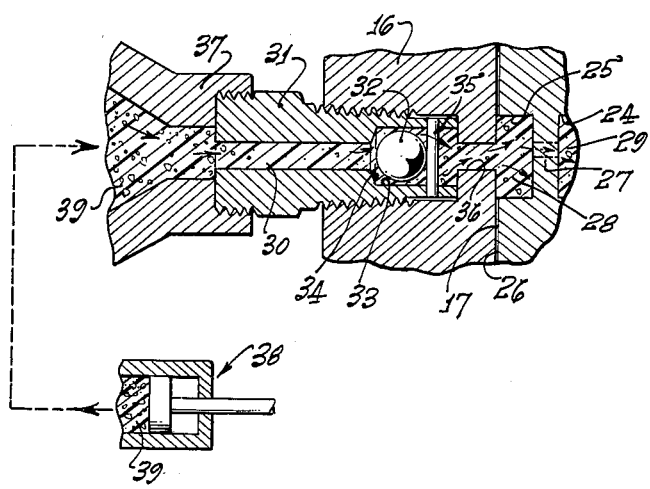

These and other features and objects of the invention, as well as the details of an illustrative embodiment, will be more fully understood from the following detailed description of the drawings, in which:

FIG. 1 is a cross section through a fragmentary portion of a valve showing the packing in injected condition sealing off clearance between the valve stem and housing members; and FIG. 2 is an enlarged section taken through the valve stem and housing member of FIG. 1, showing the method of injecting the lubricant coated polymer resin particles through restricted passages, around sharp corners and past a check valve.

As shown in the drawings, a valve shaft or spindle 10, keyed at 11 to a plug stopper 12, is rotatable in the bore 13 of a sleeve 14. The latter is in turn received within the bore 15 of a body 16 housing the sleeve, and it will be understood that slight clearance exists between the sleeve and body on the one hand enabling the sleeve to be fitted into the bore 15, and between the sleeve and shaft on the other hand to permit rotation of the shaft in bore 13, clearance between the sleeve and body being shown at 17 in FIG. 2.

The valve stopper turns in a body chamber 18 about the axis of spindle 10, rotation of the latter serving to bring passage 19 through the stopper into and out of registration with body passages 20 and 21 for controlling pressure flow of fluid through the valve. It is apparent that upstream fluid pressure communicated through passage 20 to the stopper, is also communicated through the clearance at 22 between the stopper and body to chamber 18 and then upwardly through the clearance 17 between the sleeve 14 and body 16, as better shown in FIG. 2. Also, since the sleeve 14 and stopper are not integral, the sleeve lower end being loosely received in stopper recess bore 23, fluid pressure in chamber 18 is communicated between the sleeve and stopper and then upwardly through the clearance between the sleeve and shaft 10.

To pack off the clearances between the sleeve 14, shaft 10 and body 16 and thereby contain the fluid pressure in those clearances, inner and outer annular packing spaces 24 and 25 are sunk into the sleeve bore 13 and outer surface 26, a circularly spaced series of small radial passages 27 in the sleeve communicating between spaces 24 and 25, as illustrated, so that packing material 28 in the outer space 25 may be extruded under pressure through passages 27 into the inner space 24, as indicated at 29.

The packing is injected into space 25 in the first instance through restricted opening or channel 30 in a fitting 31 threaded into body 16, past ball check valve 32 retained in enlarged passage 33 in the fitting between seat 34 and stake 35, and through restricted opening 36 in body 16 communicating with packing space 25, as better indicated in FIG. 2. The outlet end of a packing injector 37 is therein shown as connected to the inlet of fitting 31, the injector plunger and cylinder being schematically shown at 38 in the act of forcibly injecting the packing 39 under pressure through the openings and passages described and into spaces 25 and 24.

The packing is made up principally of "Teflon" grains, preferably of fairly regular size, and while this is not limitative on the broader aspects of the invention, I have found that grains of "30 to 50 mesh" serve the purpose particularly well. Such grains, normally irregular, have cross dimensions or "diameters" varying from about .004 inch to about .050 inch. With these grains I mix a viscid substance, such as cup grease, #30 lubricating oil, or the like, cup grease being broadly definitive of a large category of lubricating greases including combinations of petroleum products with soap bases, as described in "Lubricating Greases, Their Manufacture and Use," a text by E.N. Klemgard, 1937 edition, published by Reinhold Publishing Corporation, New York. The most advantageous weight ratio of the "Teflon" to the cup grease is about 5 to 1, whereas in the case of #30 lubricating oil the ratio may be from about 15:1 to 30:1.

Preferably, the admixing is done in a stirring machine whereby the admixture is mixed in a manner to coat, in effect, each grain of "Teflon" with the viscid substance. The resulting pliant or extrusile mass may then be directly injected into a packing groove, or it may be shaped by pressing in a mold or by extrusion through an orifice into cylindrical "sticks" or "cartridges" for later injection into a packing groove by a usual pressure tool. The viscid substance acts as a binder to yieldingly hold the stick in shaped form prior to its injection.

Now, it will be understood that the viscid substance is not depended upon as a shaft lubricant or as a clearance sealing medium in the final packing; in fact, the viscid substance may be dissipated by heat or chemical action very shortly after the packing is installed and therefore not even be present in the final packing after a relatively short period of use. The "Teflon," alone, may be the "lubricating" and sealing medium finally depended upon. The admixture will have been resiliently compressed within the packing groove or spaces by the pressural injection thereof. Then, as the viscid substance dissipates, the resiliently deformed "Teflon" grains will, by reason of their "spring-back" tendencies, normally maintain much of the original "non-friction" pressural contact between the members and the seal.

The main purpose of the viscid substance is to provide what amounts to a relatively thick coating around each grain of "Teflon," the coatings, in turn, acting as separators between the individual grains (though the substance, in one sense, initially "sticks" the grains together to form a cohesive mass), holding them sufficiently spaced apart to insure that their surface irregularities cannot interlock. Therefore the individual grains can individually slide with respect to one another when the mass is exposed to extrusive or injection pressure, and thus the entire mass can be forced through small orifices, around barriers and sharp corners and, finally, into such position that the packing grooves or spaces are entirely filled. When the spaces are filled, added pressure is applied to the mass so that the "Teflon" is tightly engaged with the groove wall and the packed-off member, and is put under compression, check valve 32 subsequently holding the pressure and confining the packing against escape from the spaces 24 and 25 through openings 36, 33 and 30.

Of course as long as the viscid substance remains in the packing, it helps as a lubricant and liquid seal but, as has been said, if it becomes dissipated by heat or the action of the liquid being controlled by the valve or pump, more packing can be added until finally the resilient mass of "Teflon" grains takes over the full sealing and "lubricating" duties. The follow-up charge of the packing composition is used to more tightly pack the initial charge from which the viscid substance has been dissipated.

I have thus provided a "Teflon" packing composition which may be pressurally injected into packing grooves, in spite of the fact that a mass of "Teflon" grains, by itself is not amenable to such injection. Thus, I have made it possible to gain all the well known advantages of "Teflon" as a packing, in an environment which had been thought to be inaccessible to injection of such material.

While the primary function of the lubricant coating the "Teflon" particles is to facilitate their injection into packing spaces as described, it is contemplated that the lubricant may also serve the secondary purpose of maintaining the pressure of the packing in the packing spaces close to or equal to the initial injection pressure throughout the useful service life of the valve, pump or particular item of equipment. Such injection pressures should desirably be as large as the fluid pressures to be handled or encountered by the equipment, in order that the packing may contain them, and may be as high as 15,000 p.s.i.

Since the admixed soap base and mineral oil or petroleum fractions of ordinary cup grease tend to separate at higher temperatures, say over 200 degrees F., the mineral oil then tending to escape by run-off or partial evaporation through clearances previously packed-off, a lubricant having a minimum or no mineral oil content is most desirable for high temperature application. Viscous semi-solids or lubricants having a high melting or dropping point and preferably but not necessarily a low mineral oil or petroleum fraction are, accordingly, desirable for use in accomplishing both the primary and secondary functions mentioned, their relatively higher percentage soap base constituents, such as salts of fatty acids, fats and the like serving to lubricate the "Teflon" particles facilitating their injection, and the total or near lack of a petroleum fraction eliminating the lubricant escape problem. Also, since the "Teflon" particles serve as a solid lubricant for the shaft, the presence of petroleum in the grease is not of primary importance to shaft lubrication.

One particular semi-solid or grease-like composition found entirely adequate in the above respect for maintaining initial injection pressure of the packing is non-melting (has no dropping point) and maintains a stable, very viscous nature through a temperature range of −40 degrees F. up to 550 degrees F. This lubricant has a Cleveland open cup flash point of 520 degrees F., and the following approximate composition:

| | Percent |
|---|---|
| Mineral oil | None |
| Fatty acids | 56 |
| Synthetic resins | 11 |
| Metallic soaps | 7 |
| Synthetic wax | 10 |
| Mineral matter | 10 |

Other non-melting greases capable of retention in the packing space under high temperature conditions for maintaining the pressure in that space, are the commercial greases known as "Mobiletemp Grease No. 1," a product of the General Petroleum Corporation, Los Angeles, California, and "Shell Darina Grease No. 2," a product of the Shell Oil Company. The latter grease includes mineral oil having viscosity indexes (Saybolt Universal seconds) at 100 degrees F. and 210 degrees F. of 540 and 92 respectively, and a clay type thickener used to obtain non-melting characteristics.

Referring once more to the sizes of the "Teflon" particles injected into spaces 24 and 25, they should have maximum dimensions larger than the clearances to be packed off, in order that there be no problem of particle escapage under pressure through the clearances. On the other hand, the particle maximum dimensions must be smaller than the openings or passages through which injection takes place.

It is also of importance, particularly in those instances where the lubricant coating may escape during high temperature service and under circumstances where it is undesirable to repeatedly inject more packing into spaces 24 and 25 after decrease of pressure therein due, for example, to lubricant escape, that the "Teflon" particles be initially resiliently compacted to a sufficiently reduced volume that in the event of subsequent lubricant dissipation from the spaces 24 and 25, the particles will expand to maintain desired sealing pressure against the shaft, housing and sleeve. Thus, the particles should be compressed so that in the event of total lubricant dissipation, they will substantially fill the packing spaces and yet remain sufficiently compressed to exert sealing pressure against confining walls.

I claim:

1. The method of injection molding a mass of irregular granular tetrafluoroethylene polymer resin particles to pack off the clearance between a shaft and housing therefor forming a packing space communicating with said clearance, said particles being within the size range .004 to .050 inch, that includes coating said mass with a high melting point fluid lubricant enabling the particles to slide easily over one another, the total weight of said mass of particles substantially exceeding the total weight of the lubricant coating, injecting said mass of coated particles under extreme pressure through a restricted opening larger than said clearance and into said packing space, said particles having much greater resiliency than said lubricant and having maximum dimensions larger than said clearance and smaller than said restricted opening, continuing said injection until said mass fills said space exerting pressure against said housing and shaft and until said injected particles become sufficiently compressively interengaged that in the event of subsequent and substantially complete lubricant dissipation from said space the particles will themselves expand to fill substantially said space and to exert sealing pressure against said shaft and housing, and confining said pressurized mass against escape from said space through said opening.

2. The method of injection molding a mass of irregular granular tetrafluoroethylene polymer resin particles to pack off the clearance between a shaft and housing therefor forming a packing space communicating with said clearance, said particles being within the size range .004 to .050 inch, that includes coating said mass with a high melting point fluid lubricant enabling the particles to slide easily over one another, the total weight of said mass of particles being at least about five times the total weight of the lubricant coating, pressure forming said mass of coated particles into a compacted adherent body of discrete particles in elongated stick form, injecting said stick form body of coated particles under extreme pressure through a restricted opening larger than said clearance and into said packing space against said housing and shaft, said particles having much greater resiliency than said lubricant and having maximum dimensions larger than said clearance and smaller than said restricted opening, continuing said injection until said mass fills said space exerting pressure against said housing and shaft and until said injected particles become sufficiently compressively interengaged that in the event of subsequent and substantially complete lubricant dissipation from said space the particles will themselves expand to fill substantially said space and to exert sealing pressure against said shaft and housing, and confining said pressurized mass against escape from said space through said opening.

References Cited in the file of this patent
UNITED STATES PATENTS

| | | |
|---|---|---|
| 1,056,010 | Dailey | Mar. 18, 1913 |
| 1,558,925 | Rogers | Oct. 27, 1925 |
| 1,844,903 | Queen | Feb. 9, 1932 |
| 2,578,523 | Llewellyn | Dec. 11, 1951 |
| 2,586,357 | Llewellyn | Feb. 19, 1952 |
| 2,685,707 | Llewellyn | Aug. 10, 1954 |
| 2,731,282 | McManus et al. | Jan. 17, 1956 |
| 2,770,842 | Hahn et al. | Nov. 20, 1956 |